United States Patent [19]
McClure et al.

[11] 3,960,238
[45] June 1, 1976

[54] SOUND ATTENUATING ENGINE ENCLOSURE

[75] Inventors: Randall D. McClure; Jerry G. Marques, both of Decatur, Ill.

[73] Assignee: Caterpillar Tractor Co., Peoria, Ill.

[22] Filed: Apr. 30, 1975

[21] Appl. No.: 573,216

[52] U.S. Cl.............................. 181/33 K; 180/69 R
[51] Int. Cl.² ........................................ G10K 11/04
[58] Field of Search................ 181/33 K; 180/69, 70

[56] References Cited
UNITED STATES PATENTS

| | | | |
|---|---|---|---|
| 3,358,787 | 12/1967 | Bangasser et al. | 180/69 R |
| 3,695,386 | 10/1972 | Thien et al. | 181/33 K |
| 3,762,489 | 10/1973 | Proksch et al. | 180/69 R |
| 3,815,965 | 6/1974 | Ostwald | 181/33 K |
| 3,820,629 | 6/1974 | Carlson et al. | 181/33 K |
| 3,897,850 | 8/1975 | Thompson | 181/33 K |
| 3,923,114 | 12/1975 | Suzuki | 181/33 K X |

*Primary Examiner*—Lawrence R. Franklin
*Attorney, Agent, or Firm*—Eugene C. Goodale

[57] ABSTRACT

An engine enclosure is disclosed having improved sound attenuating capabilities. The enclosure includes side panels, a front and rear and top and bottom thereof which define the engine area. Doors in the side panels permit access to the engine compartment for service thereof. Sound attenuating material is fastened to the inside surfaces of the side panels, doors and rear fire wall members. Acoustic baffles cooperate with the attenuating material to attenuate noise emanating from the engine compartment. Openings in the members permit flow of air into the engine compartment to satisfy engine cooling requirements. Sealing means cooperating between adjoining members provide for further sound attenuation.

5 Claims, 11 Drawing Figures

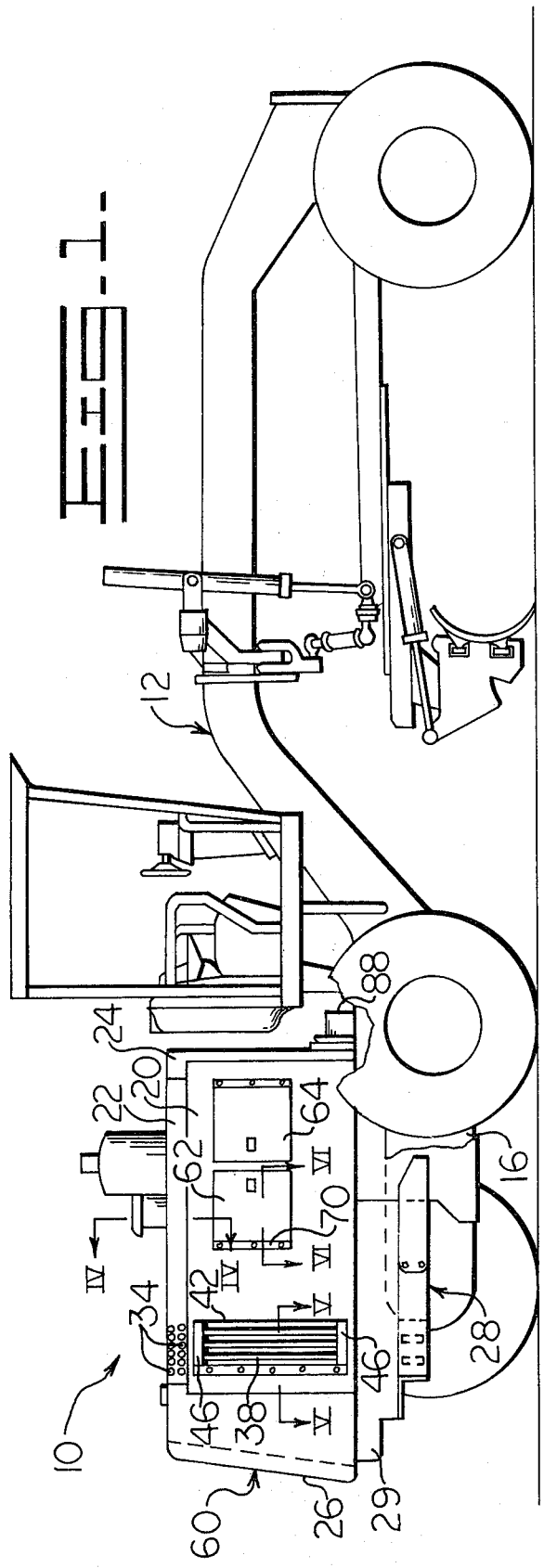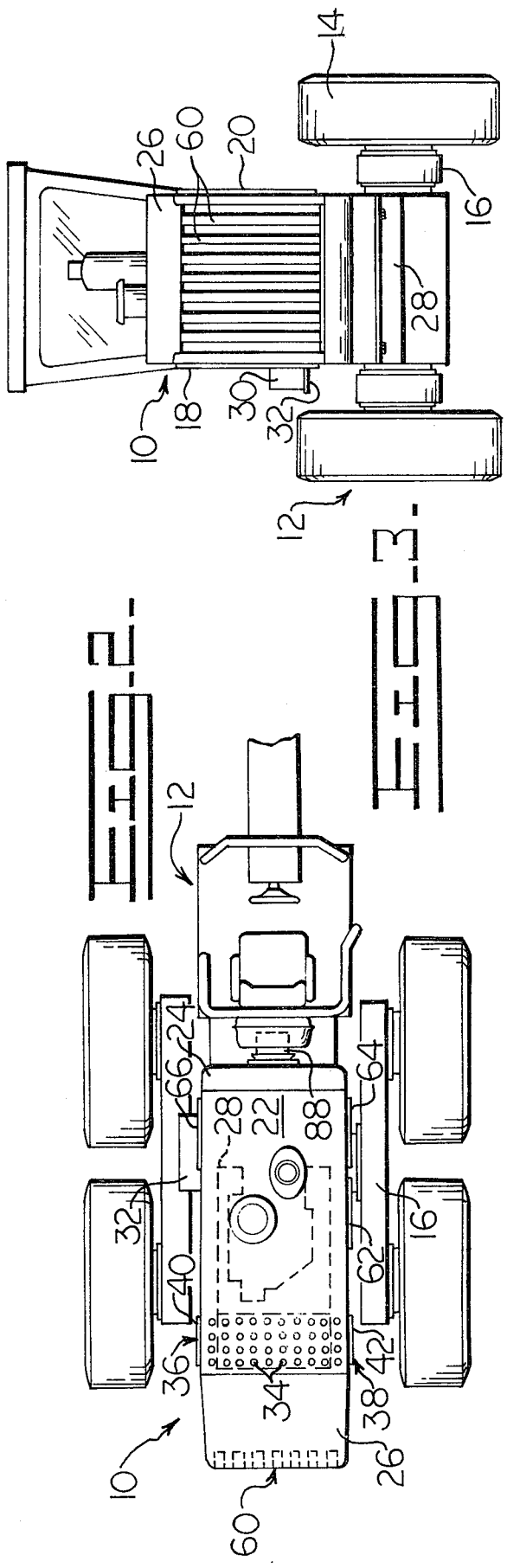

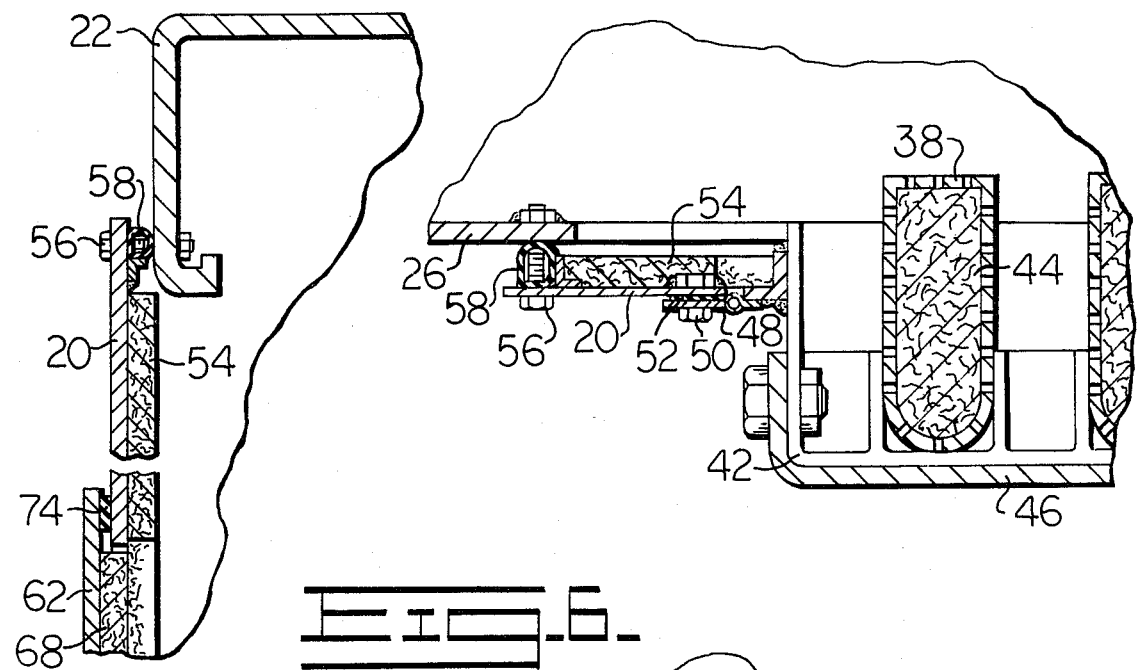

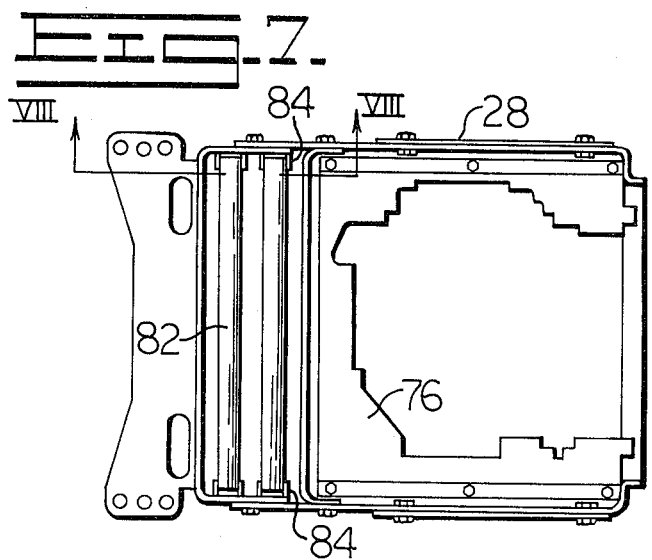
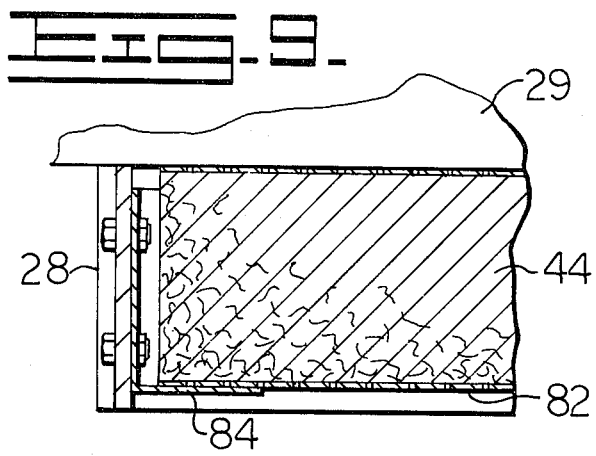
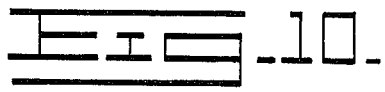
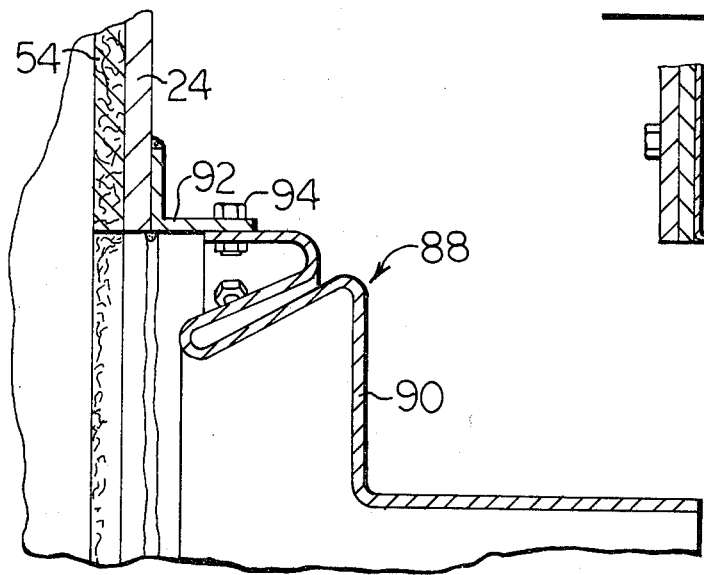

SOUND ATTENUATING ENGINE ENCLOSURE

BACKGROUND OF THE INVENTION

This invention relates generally to engine enclosures, and more particularly to an improved engine enclosure having sound attenuation capabilities without restricting the necessary flow of air for cooling the engine.

Engine enclosures have long been used for moving vehicles not only for sound attenuation but also for protection. In the earthmoving equipment such as motor graders, crawler tractors, off-highway trucks and the like, Government legislation has imposed rather stringent limitations upon the levels to which operators and spectators are exposed. Many conventional engine enclosures will not meet these new limitations.

The ultimate in sound attenuation for an engine enclosure would be to completely enclose the engine within a soundproofed compartment. However, this is not only impractical but would have a detrimental effect upon the engine cooling requirements. Engine cooling characteristics would be greatly increased by eliminating side and frontal portions of the enclosure but the noise exposure in this case would be excessive. Thus, there is a trade-off between optimum cooling conditions and favorable noise attenuation characteristics.

Accordingly, it is an object of this invention to provide a sound attenuating engine enclosure which is rugged, effective, yet permits easy access to the engine compartment for service and repair functions, and which also provides adequate air flow for engine cooling.

A still further object of this invention is to provide a sound attenuating engine enclosure which comprises sound attenuating radiator guards, hood, side covers, and a belly pan cover.

Yet another object of this invention is to provide a sound attenuating engine enclosure having sound attenuating material fastened to the inside surfaces of respective enclosure members and also providing adequate air flow openings in the enclosure to permit cooling of the engine.

And still a further object of this invention is to provide a sound attenuating engine enclosure having sealing means cooperating between members to provide added sound attenuation.

SUMMARY OF THE INVENTION

This invention relates to a sound attenuating engine enclosure particularly adaptable to earthmoving vehicles. The enclosure consists of panels having sound attenuating material secured thereto. Seals are used to coact between complementary members so as to provide a substantially airtight enclosure having large flat surfaces which are damped and isolated from structure borne excitation. Sufficient smaller pivotal doors in the panels permit ready access to the engine compartment. A plurality of openings in the enclosure members provide effective noise dissipation while allowing cooling air to flow with minimal restriction through the compartment.

Other objects, details, uses, and advantages of this invention will become apparent as the following description of the exemplary embodiment thereof presented in the accompanying drawings proceeds.

BRIEF DESCRIPTION OF THE DRAWINGS

The accompanying drawings show a present exemplary embodiment of this invention in which:

FIG. 1 is a side elevational view, partially broken away, showing the engine enclosure of this invention with use on a motor grader;

FIG. 2 is a plan view of the engine enclosure of FIG. 1;

FIG. 3 is an end view of the engine enclosure of FIG. 1;

FIG. 4 is a sectional view taken along line IV—IV of FIG. 1;

FIG. 5 is a sectional view taken along line V—V of FIG. 1;

FIG. 6 is a sectional view taken along line VI—VI of FIG. 1, particularly showing the access door mounting means;

FIG. 7 is a plan view of the belly cover;

FIG. 8 is a sectional view taken along line VIII—VIII of FIG. 7;

FIG. 9 is a sectional view taken along line IX—IX of FIG. 8;

FIG. 10 is a sectional view taken along line X—X of FIG. 8; and

FIG. 11 is a fragmentary sectional view taken through the fire wall and particularly showing the pump drive shaft boot member.

DESCRIPTION OF ILLUSTRATED EMBODIMENT

Reference is now made to FIGS. 1-3 of the drawings, which illustrate one exemplary embodiment of the improved sound attenuating engine enclosure of this invention, which is designated generally by the reference numeral 10. For illustrative purposes only, it is seen that the engine enclosure 10 is used for providing the motive power for a motor grader 12. In FIG. 1, one wheel 14 and part of the right side of drive housing 16 has been cut away to particularly show the undercarriage.

The enclosure 10 comprises left and righthand side panels 18 and 20 respectively, a top or hood 22, a forward wall or fire wall 24, a radiator guard 26, and a belly cover 28. The aforementioned members of the enclosure 10 substantially define an enclosed engine compartment and a separate engine heat exchanger and fan compartment. The engine and engine enclosure are mounted on a vehicle frame 29 in a known manner and need not be described herein. In order to provide a streamlined and relatively compact engine enclosure, the battery 30 is supported on a battery support 32 exteriorly of the engine enclosure 10.

In order to provide adequate cooling of the engine, a sufficient amount of air must be allowed to pass through the engine heat exchanger and fan compartment. This is accomplished by providing air opening means adjacent the fan compartment. The hood or top 22 is formed with a multiplicity of punched holes or apertures 34 located adjacent the fan compartment so as to provide air passage therethrough. Depending on the construction of the fan blade, air will either be drawn in through the apertures 34 or blown out the apertures 34.

In addition to the apertures 34, air opening means are provided on each side of the enclosure 10 in the form of baffles or louvers 36 and 38 respectively. The louvers 36 and 38 are positioned adjacent the fan compartment and are mounted on fan access doors 40 and 42 respectively. The louvers or baffles 36 and 38 may be of any suitable sound attenuating type construction. Examples of such louvers or baffles are described in Proksch et al U.S. Pat. No. 3,762,489 and Carlson et al U.S. Pat. No. 3,820,629, each of which is assigned to the assignee of the present application, and the teachings of which are incorporated herein by reference as though specifically set forth herein.

As specifically shown in FIG. 5, the baffles 38 are made of a perforated outer shell enclosing a sound absorbing material 44 therein. Each of the louvers 38 is supported by a suitable holer 46 at each end thereof. The access door 42 is hingedly secured to the side panel 20 by suitable hinge means 48. The hinge 48 is securedly fastened to the panel 20 by suitable means such as nut and bolt 50. A flat seal 52 may be positioned between the hinge member 48 and the panel 20 to further decrease any structural vibrations or sounds therethrough. Suitable sound attenuating material 54 is secured to the inside surface of the panel 20 by any suitable means. The panel 20 is securely fastened to the radiator guard 26 by a suitable means such as a nut and bolt 56. To further decrease any sound transmission therethrough, a seal member 58 such as a sound isolating gasket is positioned between the panel 20 and guard 26. This sealing gasket 58 and others provide a substantially airtight and sound isolating gasket completely about the periphery of each of the side panels. When either of the access doors 40 or 42 are pivotally opened, access may be had to the fan compartment for service thereof.

A multiplicity of sound attenuating louvers or baffles 60 are mounted in the radiator guard 26. The louvers 60 and means for mounting same are similar to that hereinabove described with reference to the fan access doors 40 and 42 and further described in detail in the aforementioned patents.

The side panel 20 is provided with access doors 62 and 64 which permit access into the engine compartment for service thereof. A similar door 66 is secured to the lefthand side panel 18 as seen in FIG. 2. Each of the doors 62, 64, and 66 are hingedly attached to the respective side panels.

As best seen in FIGS. 4 and 6, a sound attenuating material 68 is secured by any suitable means to the inside surface of the door 62. It should be noted that although only door 62 is being described herein, doors 64 and 66 are similarly constructed. The door 62 is securely fastened to a hinge member 70. The other edge of hinge 70 is secured to the side panel 20 by any suitable manner such as by a nut and bolt 72. If desirable, a gasket or seal member may be placed between the hinge 70 and the panel 20 to provide additional sound attenuation. The doors are latched in the closed position by any suitable means. It may be seen in FIG. 6 that the sound attenuating material 68 together with the material 54 provides a substantially continuous sound attenuating surface throughout the entire inside surface of the panel 20. In the embodiment shown in FIG. 6, it is seen that the door 62 seats against the panel 20. In some instances to secure further sound isolation and attenuation, a gasket or seal 74 may be placed between the door 62 and panel 20, as seen in FIG. 4. The panel 20 is sealingly secured to the hood or top member 22 in the manner hereinabove described with regard to the radiator guard 26. Thus, a seal or gasket 58 is secured between the panel 20 and the hood 22 as hereinabove described by any suitable means such as nut and bolt 56.

A belly area closure member, designated generally as 28 and particularly seen in FIGS. 1 and 7, provides further sound attenuation in the transmission and gear train area. A suitable seal or baffle member 76 is supported between plates 78 and 80 of the belly cover 28 as seen in FIG. 8. The seal 76 is complementally formed to cooperate with and engage the gear transmission housing and the like in the belly area. When the belly cover 28 is mounted in place as seen in FIG. 1, the seal 76 is in cooperative engagement with the housing and serves as a sound attenuation member for that area. The belly cover 28 is provided with an air passageway therethrough and in which is mounted a plurality of sound attenuating baffles or louvers 82. The louvers 82 are of a perforated structure enclosing a sound absorbing material 44 as hereinabove described. The louvers 82 are mounted in the belly cover 28 by any suitable means. As an example, the ends of the louvers 82 may be supported in support structures 84 at each end thereof. The belly cover 28 is secured to the vehicle main frame 29 by any suitable means such as a plurality of bolts 86 or the like.

A main hydraulic pump drive shaft area closure member, designated generally as 88, is mounted about the drive shaft to provide sound attenuation thereabout. The member 88 comprises a relatively flexible boot 90 which is secured to a rigid member 92 by any suitable means such as nuts and bolts 94. The rigid member 92 is secured by any suitable means such as welding or the like to the exterior surface of the fire wall 24 as seen in FIG. 11. The boot 90 may be of any suitable material such as polyvinyl chloride and as seen partially encloses the main hydraulic pump drive shaft to alter the intensity and avenue of sound emission from the front of the engine enclosure 10. Sound attenuating material 54 is secured to the inside surface of the fire wall 24.

It is seen that the engine enclosure described hereinabove substantially encloses the entire engine, fan, and engine heat exchanger therewithin. All major sound generating components are enclosed within the engine enclosure 10 and boot 90 as well as the belly cover 28. Sound absorbing material and seals provide a substantially airtight and sound attenuating enclosure. The sound absorbent material secured to the inside surfaces of the engine enclosure may be any suitable material which will withstand high ambient temperatures, is fire resistant and semi-impervious to oils, fuels, and other combustible liquids.

Thus, the engine enclosure provides improved sound attenuation for the operator as well as spectators in the vicinity while allowing adequate cooling in the air flow for the vehicle's engine and transmission, yet still allowing easy access for servicing the engine within the enclosure. Accordingly, the objectives hereinbefore set forth have been accomplished.

While the present exemplary embodiment of this invention has been illustrated and described, it will be recognized that this invention may be otherwise variously embodied and practiced by those skilled in the art.

What is claimed is:

1. A sound attenuating engine enclosure comprising: two side panels, front and rear portions, a hood member and a belly cover, said components defining generally an engine compartment and an engine heat exchanger and fan compartment;

sealing means about the periphery of said side panels for forming a substantially airtight barrier therearound;

said hood member being formed with a multiplicity of apertures formed therein substantially adjacent the fan compartment;

air passage means in each of said side panels adjacent the fan compartment to permit air flow therethrough and access to the fan compartment;

means in said side panels to permit access to the engine compartment;

said front portion having air passage means therethrough;

sound attenuating means secured to the inside surfaces of said side panels and front portion; and a belly cover seal supported by said belly cover, said seal being complementally formed to the shape of the belly area wherein said seal engages the belly housing when said belly cover is installed in place.

2. The invention as set forth in claim 1 in which said belly cover further comprises air passage means therethrough.

3. The invention as set forth in claim 2 in which said access means are pivotally mounted doors, said doors having sound attenuating material secured to the inside surface thereof wherein said doors permit access to the interior of the engine enclosure.

4. The invention as set forth in claim 3 in which said side panel air passage means includes hinged doors having sound attenuating louvers mounted therein.

5. The invention as set forth in claim 4 further comprising boot means secured to said front portion and substantially enclosing the pump drive shaft area.

* * * * *